United States Patent

Wize

[15] 3,695,688
[45] Oct. 3, 1972

[54] MULTI-POSITION VEHICLE SEAT
[72] Inventor: Gary A. Wize, Utica, Mich.
[73] Assignee: General Motors Corporation, Detroit, Mich.
[22] Filed: June 9, 1971
[21] Appl. No.: 151,357

[52] U.S. Cl. .....................297/92, 297/379, 296/66
[51] Int. Cl. ..............................................B60n 1/10
[58] Field of Search ......297/94, 92, 95, 379; 296/66, 296/65; 5/47, 48

[56] References Cited

UNITED STATES PATENTS

| 2,677,574 | 5/1954 | Golubics | 296/66 |
| 2,858,550 | 11/1958 | Richter | 5/47 |
| 2,926,948 | 3/1960 | Koplin | 296/66 |
| 3,188,133 | 6/1965 | Tewksbury | 297/92 X |
| 3,529,863 | 9/1970 | Belfry | 297/92 X |

Primary Examiner—Francis K. Zugel
Attorney—J. L. Carpenter and E. J. Biskup

[57] ABSTRACT

A multi-position seat for a vehicle including a seat back cushion and a seat cushion supported by a linkage which provides a first position wherein the seat faces forwardly, a second position wherein the seat faces rearwardly, and a third position wherein one of the seat cushions is rotated to an overlying position to permit the back portion thereof to provide a cargo area.

6 Claims, 7 Drawing Figures

INVENTOR.
Gary A. Wize

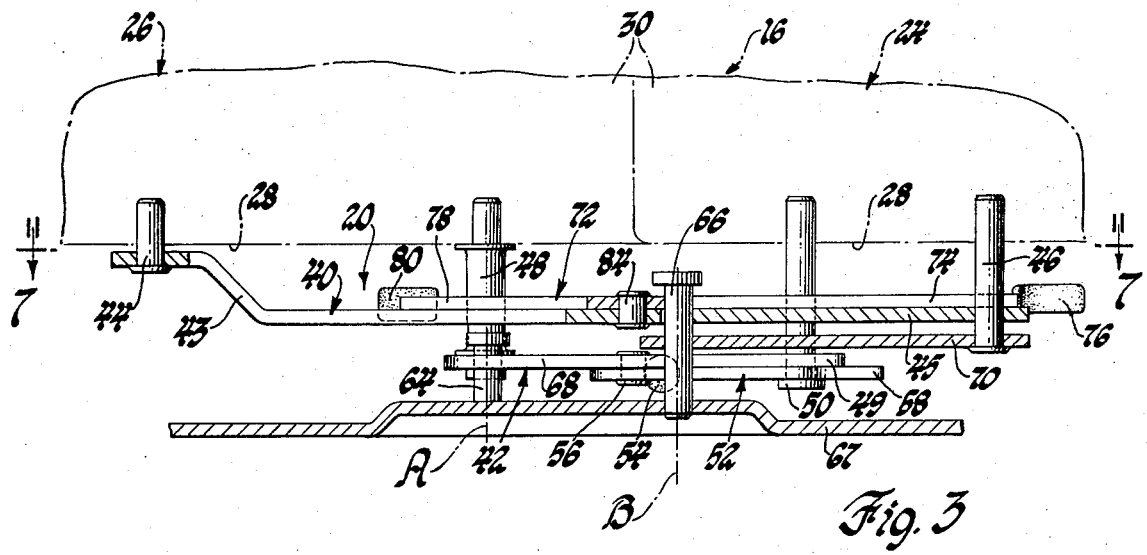

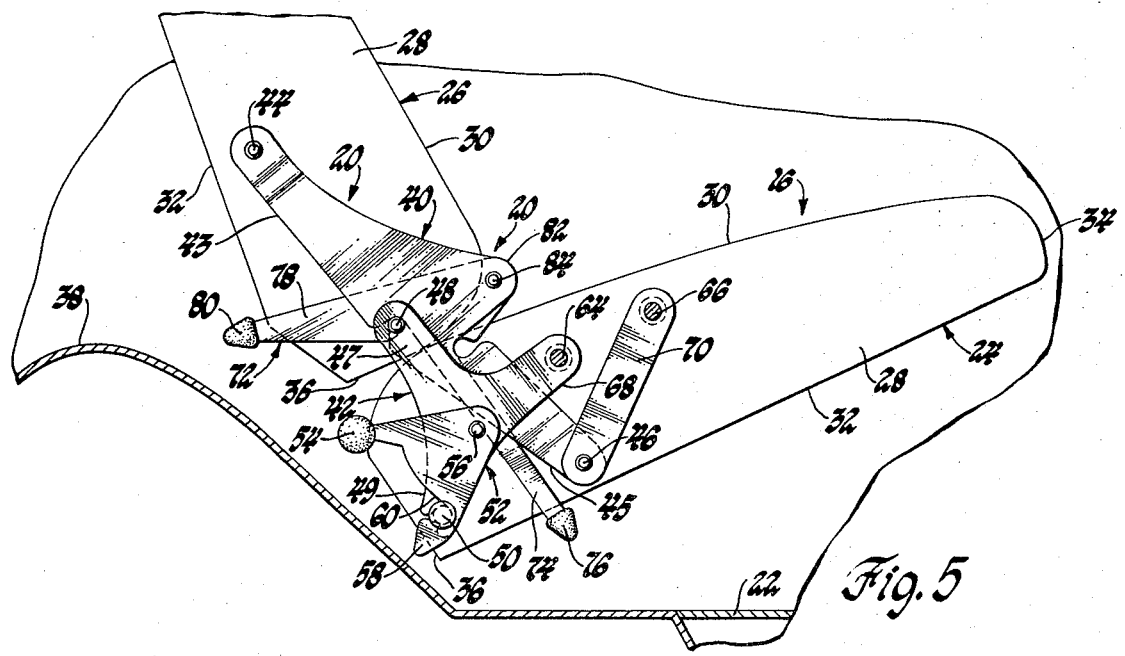

MULTI-POSITION VEHICLE SEAT

Station wagon type vehicles frequently have a seating arrangement which includes three seats, two of which are located to the rear of the driver's seat and foldable between a normal seating position and a folded or collapsed position when the rear of the vehicle is used for load-carrying purposes. When the rear seats are in the folded position, the back surface of each seat back is disposed substantially flat with the vehicle body floor pan located above the kick-up portion of the frame. It is common to have a filler panel hingedly connected to the seat back so as to provide a support surface between the folded seat backs and the floor pan. The filler panel is located in the plane of the floor pan when the seat back is in the horizontal position and thereby forms the intermediate portion of the extended support floor.

This invention, in general, concerns a seat construction of the above-described type which has a seat back that is foldable forwardly so as to convert the station wagon into a cargo-carrying vehicle and, in addition, permits the seat to be moved to a position wherein the seat back and seat cushion are located so that the seat faces rearwardly. In the preferred form, this is accomplished by utilizing a linkage at each side of the seat which includes a first link member having the opposite ends thereof pivotally interconnecting the seat and seat back cushions at first and second pivot points. A second link member similarly has two ends thereof pivotally interconnecting the cushions at third and fourth pivot points. A pair of transversely extending and horizontally spaced pivot shafts project from the vehicle side wall opposite the linkage and serve as vehicle body supports for the first and second link members. The link members are connected to the pivot shafts for pivotal movement thereabout in a manner whereby the seat is movable from a forwardly facing position to a rearwardly facing position and vice versa. In addition, a lock lever is carried by one of the link members for releasing the seat back from pivotal connection with one of the link members so as to permit the seat back to be folded over the seat cushion and thereby provide a cargo area.

The principal objects of the present invention are to provide a seat movable to three positions so as to permit the seat occupant to face forwardly or rearwardly and have the seat back foldable over the seat cushion so as to extend the cargo-carrying area of the vehicle; to provide a support linkage for a vehicle seat that permits the latter to be moved from a forwardly facing position to a rearwardly facing position and vice versa and also to a folded position for increasing the cargo-carrying area of the vehicle; to provide a latching mechanism incorporated with a support linkage which controls movement of a seat between forwardly and rearwardly facing positions and serves to unlock a part of the linkage from the seat back so as to permit the latter to be folded over the seat cushion and thereby provide a flat floor portion; to provide a seating unit for a station wagon type vehicle that is located to the rear of the driver's seat and has the seat cushion and seat back supported by a linkage which permits the seat back and seat cushion to reverse roles so that the seat unit can be moved from a forwardly facing position to a rearwardly facing position; and to provide a vehicle seat support linkage including a pair of interconnecting link members which are pivotally connected between the seat back and seat cushion and have portions thereof pivotally mounted on the vehicle for permitting the linkage to rotate about a pair of spaced pivot axes when the seat is moved from a forwardly facing position to a rearwardly facing position and vice versa.

Other objects and advantages of the present invention will be apparent from the following detailed description when taken with the drawings in which:

FIG. 3 is an enlarged view of the support linkage taken on line 3—3 of FIG. 2;

FIG. 4 is an enlarged view of the support linkage taken on line 4—4 of FIG. 2;

FIG. 5 is a view similar to FIG. 2 but shows the seat located in the rearwardly facing position;

FIG. 6 is a view similar to FIGS 2 and 5 but shows the seat located in the folded position wherein the seat back serves as a flat load supporting surface; and FIG. 7 is a reduced view taken on line 7—7 of FIG. 3.

Figure 1:
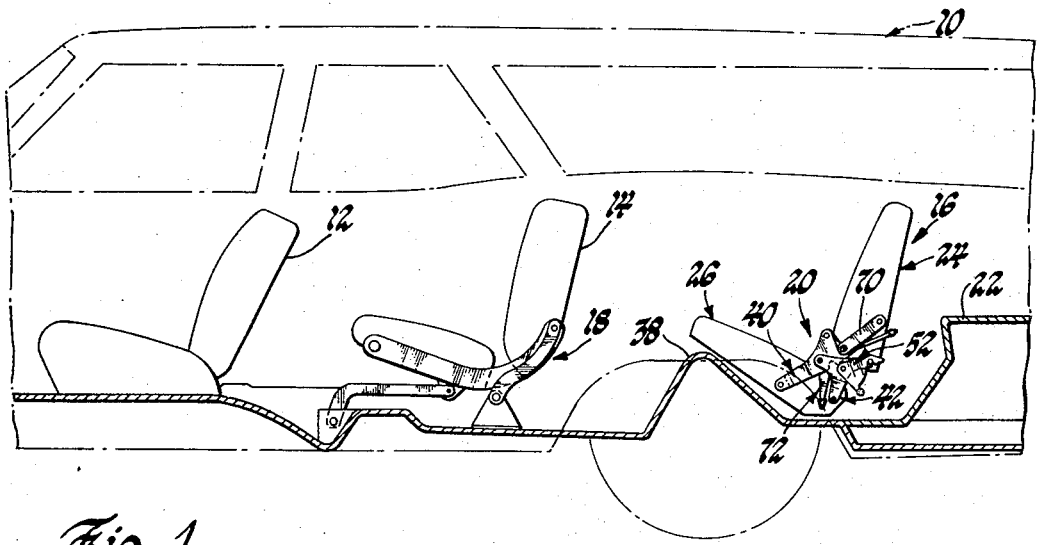
FIG. 1 shows a station type vehicle incorporating a passenger seat made in accordance with the invention.

Referring to the drawings and more particularly to FIG. 1 thereof, the passenger compartment of a station wagon type vehicle 10 is shown having a driverr's seat 12, a second or intermediate seat 14, and also a third seat 16. As can be seen, the seats 14 and 16 face forwardly and are located to the rear of the driver's seat 12. The seats 14 and 16 incorporate support linkages 18 and 20 respectively, each of which serves to move the associated seat back into a folded position so as to provide a cargo-carrying area coextensive with the floor 22 in the rear portion of the station wagon.

The seat 16 is made according to the invention and comprises a seat back 24 and a seat cushion 26, each of which is rectangular in form and defined by a pair of side portions 28 (one of which only is shown), a face surface 30, a rear surface 32, a top edge 34, and a bottom edge 36. Both the seat back 24 and the seat cushion 26 are supported by the linkage 20 which permits the seat 16 to move between three positions, namely, the forwardly facing position shown in FIGS. 1 and 2, a rearwardly facing position shown in FIG. 5, and a folded position shown in FIG. 6. The seat 16 is located to the rear of the kick-up 38 of the floor pan, the forward portion of which extends downwardly so as to provide foot space for the passengers seated in the seat.

Figure 2:
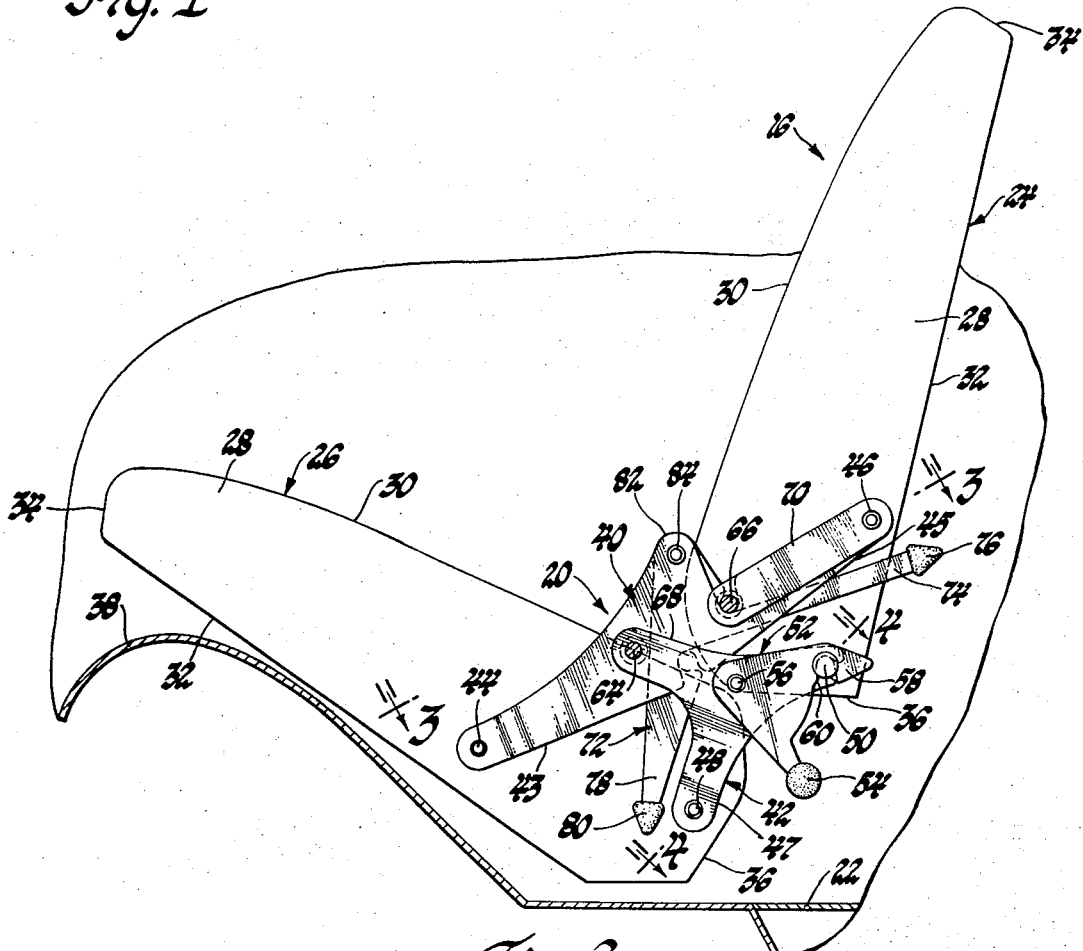
FIG. 2 is an enlarged view of the seat made according to the invention and shows the support linkage which serves to maintain the seat in a forwardly facing position and permits the seat to move to a rearwardly facing position and to a folded position.

As seen in FIGS. 2, 3 and 4, the linkage 20 includes a pair of three-armed interconnecting link members 40 and 42, each of which has portions thereof pivotally connected to the seat back 24 and the seat cushion 26. In this regard, it will be noted that link member 40 is located inboard of link member 42 and has one arm 43 connected by pivotal connection 44 to side portion 28 of the seat cushion 26, while the other arm 45 is connected by pivotal connection 46 to the side portion 28 of the seat back 24. Similarly, link member 42 has one of the arms 47 thereof connected to the side portion 28 of the seat cushion 26 by a pivotal connection 48, while the other arm 49 is connected by pivotal connection 50 to the side portion 28 of the rest back 24. Each of the pivotal connections 44 and 46 is located adjacent the rear surface 32 of the associated seat unit intermediate the top edge 34 and the bottom edge 36. The pivotal connections 48 and 50 are located adjacent the bottom edge 36 of the associated seat unit.

At this juncture, it will be noted that link member 42 carries a lock member 52 formed with a depending knob 54. The lock member 52 is connected to the interconnecting link member 42 by pivotal connection 56 and is biased in a clockwise direction about the latter pivotal connection by a spring (not shown). In addition, the lock member 52 has a hook-shaped end 58 formed with a groove 60 which is adapted to accommodate a seat back supported pin which forms a part of pivotal connection 50 as seen in FIG. 4. As seen in FIGS. 2 and 6, raising of the knob 54 causes the lock member 52 to rotate in a counterclockwise direction about its pivotal connection 56 resulting in the pin of pivotal connection 50 being released from locked engagement with the link member 42 which has an open groove 62 in arm 49 for normally accommodating the aforementioned pin. It will be noted that the grooves 60 and 62 have their longitudinal axes substantially perpendicular to each other so as to provide the locking feature explained above.

As should be apparent form the above, the interconnecting link members 40 and 42 serve to join the seat back 24 to the seat cushion 26. In addition, both link members 40 and 42 are connected to the vehicle 10 at points that are laterally spaced from the linkage 20. Thus, as seen in FIG. 3, a pair of spaced pivot shafts 64 and 66 are rigidly secured to and project horizontally from a side panel or wall 67 of the vehicle 10 and have their longitudinal centers located along a pair of parallel and transversely extending pivot axes A and B. The third arm 68 of interconnecting link member 42 is supported by pivot shaft 64 for rotation about pivot axis A. A short link 70 has one end connected to link member 40 by pivotal connection 50 and has the other end supported by pivot shaft 66 for rotation about pivot axis B. Link 70 serves as an extension of interconnecting link member 40 and control movement of the latter during repositioning of the seat unit as will hereinafter be explained.

For purposes of locking the linkage 20 and, accordingly, the seat 16 in the forwardly facing position of FIG. 2 and the rearwardly facing position of FIG. 5, a second lock member 72 is provided which as seen in FIGS. 3 and 7, is generally L-shaped with one of the legs 74 being formed with a knob 76 an the other leg 78 having a knob 80. The lock member 72 is pivotally connected to the third arm 82 of link member 40 by a pivotal connection 84 and has notches 86 and 88 formed respectively in legs 74 and 78. Also, as seen in FIG. 2, the lock member 72 is normally biased by a spring (not shown) in a counterclockwise direction about pivotal connection 84 and is located inboard of the link member 40. The notch 86 is located a distance from pivotal connection 84 so, as seen in FIG. 7, it will engage and trap pivot shaft 66 when the seat 16 is located in the forwardly facing position. In this position of the lock member 72, the seat 16 is in a locked state and maintains the forwardly facing position of FIG. 2. When the seat 16 is located in the rearwardly facing direction of FIG. 5, the notch 88 formed in the lock member 72 is adapted to entrap the pin which forms a part of pivotal connection 48.

The opposite side of seat 16 has a support linkage (not shown) that is identical to the linkage 20 except that the lock members 52 and 72 are omitted. Accordingly, parts corresponding to link members 40 and 42 and also to link 70 serve to connect the opposed side portions of seat back 24 and seat cushion 26 to the opposite side wall of the vehicle.

OPERATION

As seen in FIGS. 2 and 7, the vehicle seat 16 is in a forwardly facing position with the lock member 52 cooperating with the arm 49 of link member 42 to provide pivotal connection 50 and maintain the seat back 24 in a substantially vertical position. Similarly, lock member 72 has the notch 86 thereof entrapping pivot shaft 66 and preventing any movement of the link members 40 and 42 and seat 16 about pivot axes A and B. When it is desired to position the seat back 24 so that the rear surface 32 thereof can serve as a load-carrying surface and an extension of floor 22, the lock member 52 is raised against the bias of the associated spring causing the pin which forms a part of pivotal connection 50 to be released from the groove 60. This is followed by manually moving the top edge 34 of the seat back 24 forwardly so as to cause it to rotate in a counterclockwise direction about pivotal connection 46 into the position shown in FIG. 6. In this position, the rear surface 32 of the seat back 24 is located in a horizontal plane and through suitable means such as a detent or snap latch can be maintained in this position. Although not shown, it will be understood that a filler panel can be attached to the rear surface 32 of the seat back 24 that can then be folded forwardly for filling any void existing between the seats 14 and 16.

Movement of the seat 16 from the forwardly facing position of FIG. 2 to the rearwardly facing position of FIG. 5 is realized by first moving the leg 74 of lock member 72 in a downwardly direction or clockwise about its pivotal connection 84 with the link member 40. As mentioned before, this causes the notch 86 to move out of entrapping engagement with the pivot shaft 66 so as to free the latter from a locked state with link member 40. As a consequence downwardly applied force on the top edge 34 of the seat back 24 permits pivotal connection 46 to rotate about pivot axes A and B together with pivotal connections 48 and 50 and results in movement of the seat back and seat cushion as a unit to the FIG. 5 position. More specifically, during such movement both pivotal connections 48 and 50 rotate along arcs, pivot axis A of which is the center. Due to the connection provided by link 70 between pivot shaft 66 and link member 40, it will be noted that pivotal connection 46 will rotate clockwise along an arc, the center of which is provided by pivot axis B. Pivotal connection 44, however, during the aforementioned movement follows an irregular path which permits it to be positioned under the control of link 70 so that it is located in the final position indicated in FIG. 5. When the vehicle seat 16 assumes the latter-mentioned position, the leg 78 of lock member 72 is then automatically rotated by its associated spring in a counterclockwise direction about pivotal connection 84 so as to cause the notch 88 to engage and entrap the pin which forms a part of pivotal connection 44 thereby locking the seat 16 in a rearwardly facing position. It should be apparent that movement of the seat 16 from the rearwardly facing position of FIG. 5 to the forwardly facing position of FIG. 2 is realized by raising the leg 78 of the lock member 72 so that latter rotates in a clockwise direction about pivotal connection 84 and again releases the linkage 20. Thereafter, the top edge 34 of seat cushion 26 is forcibly moved downwardly toward the linkage 20 causing the entire seat 16 to rotate as a unit about pivot shafts 64 and 66 into the forwardly facing position of FIG. 2. Thereafter, leg 74 of lock member 72 is biased by the associated spring in a counterclockwise direction about its pivotal connection 84 causing the lock member 72 to reassume the position of FIGS. 2 and 7 and once again lock the linkage for maintaining the seat 16 in the forwardly facing position.

Various changes and modifications can be made in this construction without departing from the spirit of the invention. Such changes and modifications are contemplated by the inventor and he does not wish to be limited except by the scope of the appended claims.

I claim:

1. A three-position seat for a vehicle including two cushions each of which can serve as a seat back or a seat bottom, a linkage supporting said seat and providing a first position wherein said seat faces forwardly, a second position wherein said seat faces rearwardly, and a third position wherein one of said cushions is folded over the other of said cushions to provide a cargo area, said linkage comprising a first link member having the opposite ends thereof pivotally interconnecting said cushions at first and second pivot points, a second link member having the opposite ends thereof pivotally interconnecting said cushions at third and fourth pivot points, a pair of horizontally spaced pivot shafts laterally spaced from said link members and connected to the vehicle, means connecting said first link member to one of said pivot shafts for pivotal movement about a second transverse pivot axis passing through the center of said one of said pivot shafts, means connecting said second link member to the other of said pivot shafts for pivotal movement about a second transverse pivot axis passing through the center of said other of said pivot shafts, said first and second link members adapted to pivot about the first and second transverse pivot axes when said seat is moved from said first position to said second position and vice versa, and lock means carried by one of said link members and adapted to release one end of said one of said link members from pivotal connection with one of said cushions to permit the latter to move to said third position.

2. The seat of claim 1 wherein said links are so located that when the seat is in the second position a line passing through the first and second pivot points intersects an extension of the line passing through the third and fourth pivot points at a point located between said first and second pivot points.

3. The seat of claim 1 wherein said pivot shafts are so located that when the seat is in the second position an extension of the line interconnecting the centers of said pivot shafts passes between the first and second pivot points and the third and fourth pivot points.

4. A linkage for supporting a seat assembly having a seat back and a seat cushion in a vehicle body for movement from a forwardly facing seat arrangement to a rearwardly facing seat arrangement; said seat back and said seat cushion each being defined by a pair of side portions, a front surface, a rear surface, top edge and a bottom edge; the linkage comprising a first interconnecting link member having one end pivotally connected to the side portion of the seat back by a first pivotal connection located at a point intermediate the top edge and the bottom edge thereof, a second pivotal connection joining the other end of the first interconnecting link member to the side portion of the seat cushion at a point intermediate the top edge and the bottom edge thereof, a second interconnecting link member pivotally connected to the side portion of the seat cushion by a third pivotal connection located adjacent the bottom edge thereof, a fourth pivotal connection joining another part of the second interconnecting link member to the side portion of the seat back adjacent the bottom edge thereof, a pair of pivot shafts mounted on the vehicle body adjacent said linkage, a link having one end pivotally supported by one of said pivot shafts and the other end pivotally connected to one of said interconnecting link members by one of the pivotal connections associated therewith, the other of said pivot shafts serving to pivotally connect the other of the interconnecting link members to the vehicle body, said pivot shafts serving as a pair of stationary points about which said first, second, third and fourth pivotal connections are rotatable so that said seat assembly is movable from the forwardly facing seat arrangement to the rearwardly facing seat arrangement when a downwardly directed force is applied to the top edge of the seat back, and a lock lever carried by one of said interconnecting link members and adapted to engage one of said pivot shafts to lock the seat assembly in one of said seat arrangements and adapted to cooperate with one of said pivotal connections to lock said seat assembly in the other of said seat arrangements.

5. A linkage for supporting a seat assembly having a seat back and a seat cushion in a vehicle body for movement between a forwardly facing seat forming position, a rearwardly facing seat forming position, and a cargo-carrying position; said seat back and said seat cushion each being defined by a pair of side portions, a face surface, a rear surface, a top edge and a bottom edge; said linkage comprising a first interconnecting link member having one end pivotally connected to the side portion of the seat back by a first pivotal connection located at a point intermediate the top edge and the bottom edge thereof, a second pivotal connection joining the other end of the first interconnecting link member to the side portion of the seat cushion at a point intermediate the top edge and the bottom edge thereof, a second interconnecting link member pivotally connected to the side portion of the seat cushion by a third pivotal connection located adjacent the bottom edge thereof, a fourth pivotal connection joining another part of the second interconnecting link member to the side portion of the seat back adjacent the bottom edge thereof, a pair of spaced pivot shafts mounted on the vehicle body adjacent said linkage, a link having one end pivotally supported by one of said pivot shafts and the other end connected to one of said interconnecting link members by one of the pivotal connections associated therewith, the other of said pivot shafts serving to pivotally connect the other of the interconnecting link members to the vehicle body, said pivot shafts serving as a pair of stationary points about which said fist, second, third and fourth pivotal connections are rotatable so that said seat assembly is movable as a unit from the forwardly facing seat forming position to the rearwardly facing seat forming position and vice versa, a first lock member carried by one of said interconnecting link members and adapted to engage one of said pivot shafts to lock the seat assembly in one of said seat forming positions and adapted to cooperate with one of said pivotal connections to lock said seat assembly in the other of said seat forming position, and a second lock member carried by the other of said interconnecting link members and adapted to cooperate with the latter for releasing said seat cushion and permitting the latter to be folded forwardly to said cargo-carrying position.

6. A linkage for supporting a seat assembly having a seat back and a seat cushion in a vehicle body for movement between a forwardly facing seat forming position, a rearwardly facing seat forming position, nd a cargo-carrying position; said seat back and said seat cushion each being defined by a pair of side portions, a face surface, a rear surface, a top edge and a bottom edge; said linkage comprising a first interconnecting link member having one end pivotally connected to the side portion of the seat back by a first pivotal connection located at a point intermediate the top edge and the bottom edge thereof, a second pivotal connection joining the other end of the first interconnecting link member to the side portion of the seat cushion at a point intermediate the top edge and the bottom edge thereof, a second interconnecting link member pivotally connected to the side portion of the seat cushion by a third pivotal connection located adjacent the bottom edge thereof, a fourth pivotal connection joining another part of the second interconnecting link member to the side portion of the seat back adjacent the bottom edge thereof, a pair of horizontally spaced pivot shafts mounted on the vehicle body adjacent said linkage, a link having one end pivotally supported by one of said pivot shafts and the other end connected to said first interconnecting link member by the first pivotal connection, the other of said pivot shafts serving to pivotally connect the second interconnecting link member to the vehicle body at a point spaced from said third and fourth pivotal connections, said pivot shafts serving as a pair of stationary points about which said first, second, third and fourth pivotal connections are rotatable so that said seat assembly is movable as a unit from the forwardly facing seat forming position to the rearwardly facing seat forming position and vice versa, a first lock member carried by one of said interconnecting link members and adapted to engage one of said pivot shafts to lock the seat assembly in one of said seat forming positions and adapted to cooperate with one of said pivotal connections to lock said seat assembly in the other of said seat forming position, and a second lock member carried by the other of said interconnecting link members and adapted to cooperate with the latter for releasing said seat cushion and permitting the latter to be folded forwardly to said cargo-carrying position.

* * * * *

UNITED STATES PATENT OFFICE
CERTIFICATE OF CORRECTION

Patent No. 3,695,688          Dated October 3, 1972

Inventor(s) Gary A. Wize

It is certified that error appears in the above-identified patent and that said Letters Patent are hereby corrected as shown below:

Column 2, Line 10, "station" should read -- station wagon -- . Column 3, Line 1, after "the", second occurrence, insert -- seat -- ; Line 5, after "are" insert -- each -- ; Line 28, the word "form" should read -- from -- . Column 5, Claim 1, Line 44 "second" should read -- first -- . Column 7, Claim 5, Line 7 "fist" should read -- first --; Line 25 "nd" should read -- and -- .

Signed and sealed this 6th day of March 1973.

(SEAL)
Attest:

EDWARD M. FLETCHER, JR.
Attesting Officer

ROBERT GOTTSCHALK
Commissioner of Patents